United States Patent [19]

Fraser, Jr. et al.

[11] Patent Number: 5,076,772

[45] Date of Patent: Dec. 31, 1991

[54] SLIDER BLOCK RADIAL COMPLIANCE MECHANISM WITH INTEGRAL DEFLECTION BEARING

[75] Inventors: Howard H. Fraser, Jr., Lafayette; Thomas L. Kassouf, Syracuse, both of N.Y.

[73] Assignee: Carrier Corporation, Syracuse, N.Y.

[21] Appl. No.: 532,549

[22] Filed: Jun. 4, 1990

[51] Int. Cl.$^5$ .................... F04C 18/04; F16C 17/00
[52] U.S. Cl. .................... 418/55.5; 418/55.6; 384/309; 384/312
[58] Field of Search .................... 418/55.5, 55.6, 57; 384/303, 309, 312

[56] References Cited

U.S. PATENT DOCUMENTS

| | | | |
|---|---|---|---|
| 2,306,048 | 12/1942 | Fast | 384/309 |
| 4,496,251 | 1/1985 | Ide | 381/117 |
| 4,674,963 | 6/1987 | Morishita et al. | 418/55.1 |
| 4,676,668 | 6/1987 | Ide | 384/117 |
| 4,730,998 | 3/1988 | Kakuda et al. | 418/55.1 |
| 4,764,096 | 8/1988 | Sawai et al. | 418/55.5 |

FOREIGN PATENT DOCUMENTS

| | | | |
|---|---|---|---|
| 0343620 | 11/1989 | European Pat. Off. | 384/303 |
| 1010959 | 4/1952 | France | 384/303 |

*Primary Examiner*—John J. Vrablik

[57] ABSTRACT

The slider block of a scroll compressor has an axial bore therein which is defined by a number of pads. The pads are axially and circumferentially spaced and collectively define a deflection bearing as well as the bore.

13 Claims, 5 Drawing Sheets

SLIDER BLOCK RADIAL COMPLIANCE MECHANISM WITH INTEGRAL DEFLECTION BEARING

BACKGROUND OF THE INVENTION

In a scroll compressor the trapped volumes are in the shape of lunettes and are defined between the wraps or elements of the fixed and orbiting scrolls and their end plates. The ends of the lunettes define points of tangency or contact between the wraps of the fixed and orbiting scrolls. These points of tangency or contact are transient in that they are continuously moving towards the center of the wraps as the trapped volumes continue to reduce in size until they are exposed to the outlet port. These points of tangency or contact represent points of wear and leakage so it is desirable to permit outward radial movement of the orbiting scroll to maintain sealing contact of its wrap with that of the fixed scroll. Further, because the trapped volume may contain a liquid slug of refrigerant and/or oil it is desirable to permit inward radial movement of the orbiting scroll to permit leakage from the trapped volume(s) to relieve any excessive buildup of pressure. One approach has been to use an eccentric bushing mechanism to provide the connection between the crankshaft and the orbiting scroll. Another approach has been to use a swing link connection between the orbiting scroll and crankshaft. A slider block radial compliance device is briefly mentioned in U.S. Pat. No. 3,924,977. In this patent, the centrifugal force of the orbiting scroll is used to activate the mechanism. The line of movement of the orbiting scroll is along the centrifugal force, i.e. along the line extending from the center of gravity of the counterweight through the center of the crankshaft to the center of the orbiting scroll.

The crankshaft is supported by a thrust bearing at its lower end and is supported in the crankcase by a journal bearing. The orbiting scroll has a boss which has an axis which orbits about the axis of the crankshaft during operation. Since the connection between the boss and the crankshaft is through an eccentric slider block which must be capable of movement in a radial direction for radial compliance and liquid slugs, the combination of forces and spaced axes tends to cant the boss and/or slider block. This canting produces edge loading and resultant localized forces producing excessive wear, etc.

SUMMARY OF THE INVENTION

The present invention is directed to an improved slider block radial compliance mechanism with an integral deflection bearing. The radial compliance mechanism consists of an elongated recess in the end of the eccentric shaft and a slider block located in the recess. The slider block has an eccentric bore for receiving the boss of the orbiting scroll and the bore is defined by a deflection bearing integral with the slider block.

It is an object of this invention to provide a radial compliance mechanism incorporating an integral deflection bearing.

It is another object of this invention to reduce edge loading.

It is a further object of this invention to create a better wedge effect to thereby create better oil film thicknesses which increases load capacity and bearing life. These objects, and others as will become apparent hereinafter, are accomplished by the present invention.

Basically, the slider block rotates with the eccentric shaft and with respect to the boss of the orbiting scroll which is carried through an orbiting path relative to the axis of rotation of the eccentric shaft. The boss is received in a bore in the slider block and the bore is defined by a deflection bearing formed in and integral with the slider block. Some movement of the slider block is possible within the recess with the movement being in the nature of a sliding motion of the slider block. The amount of movement permitted will generally be on the order of 0.01 to 0.10 inches. Additionally, the deflection bearing permits some canting movement of the boss or slider block without causing movement of the other member whereby edge loading is reduced.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENT

Figure 1:
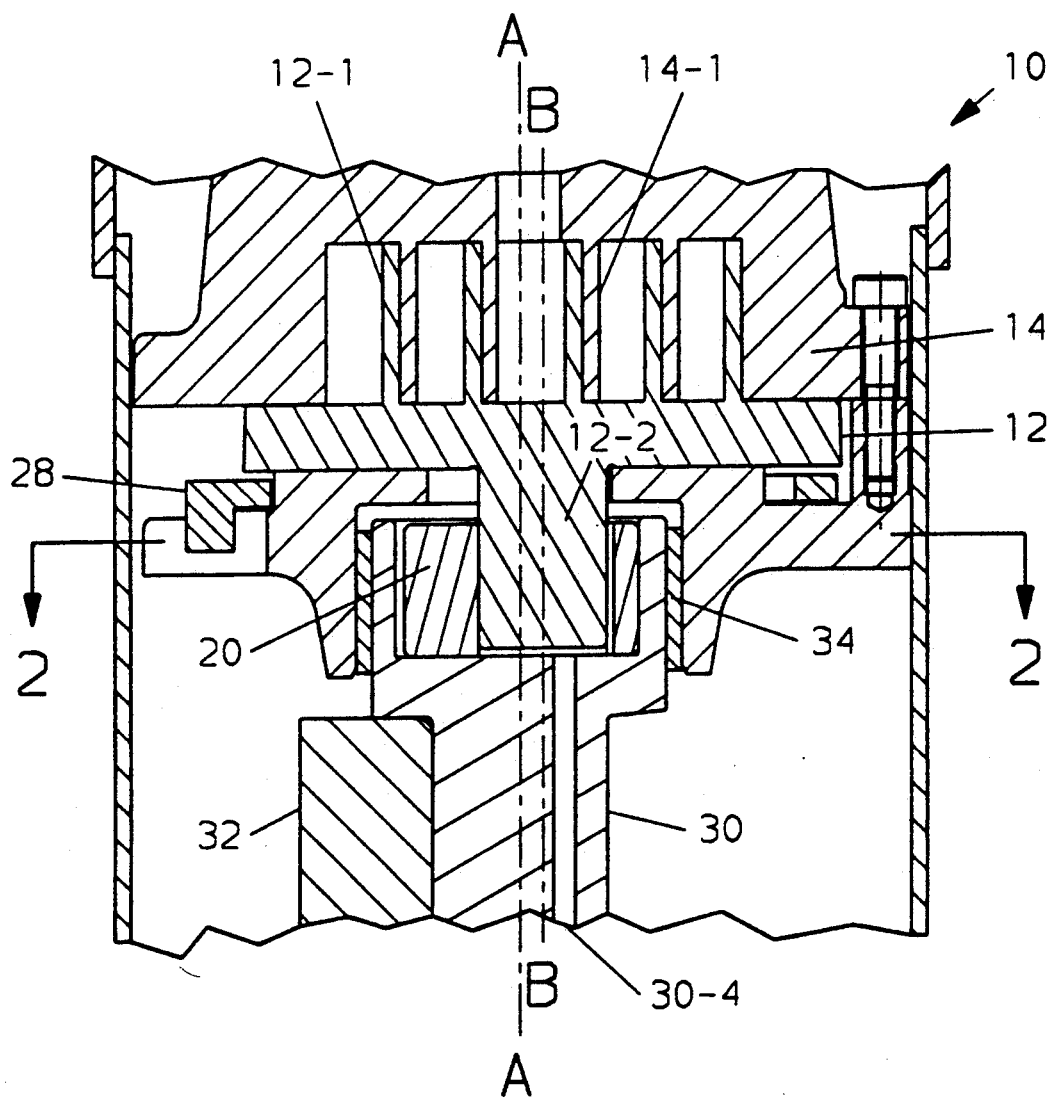
FIG. 1 is a vertical sectional view of a portion of a scroll compressor employing the slider block mechanism of the present invention and corresponds to a section taken through 1—1 of FIG. 2.
Figure 6:
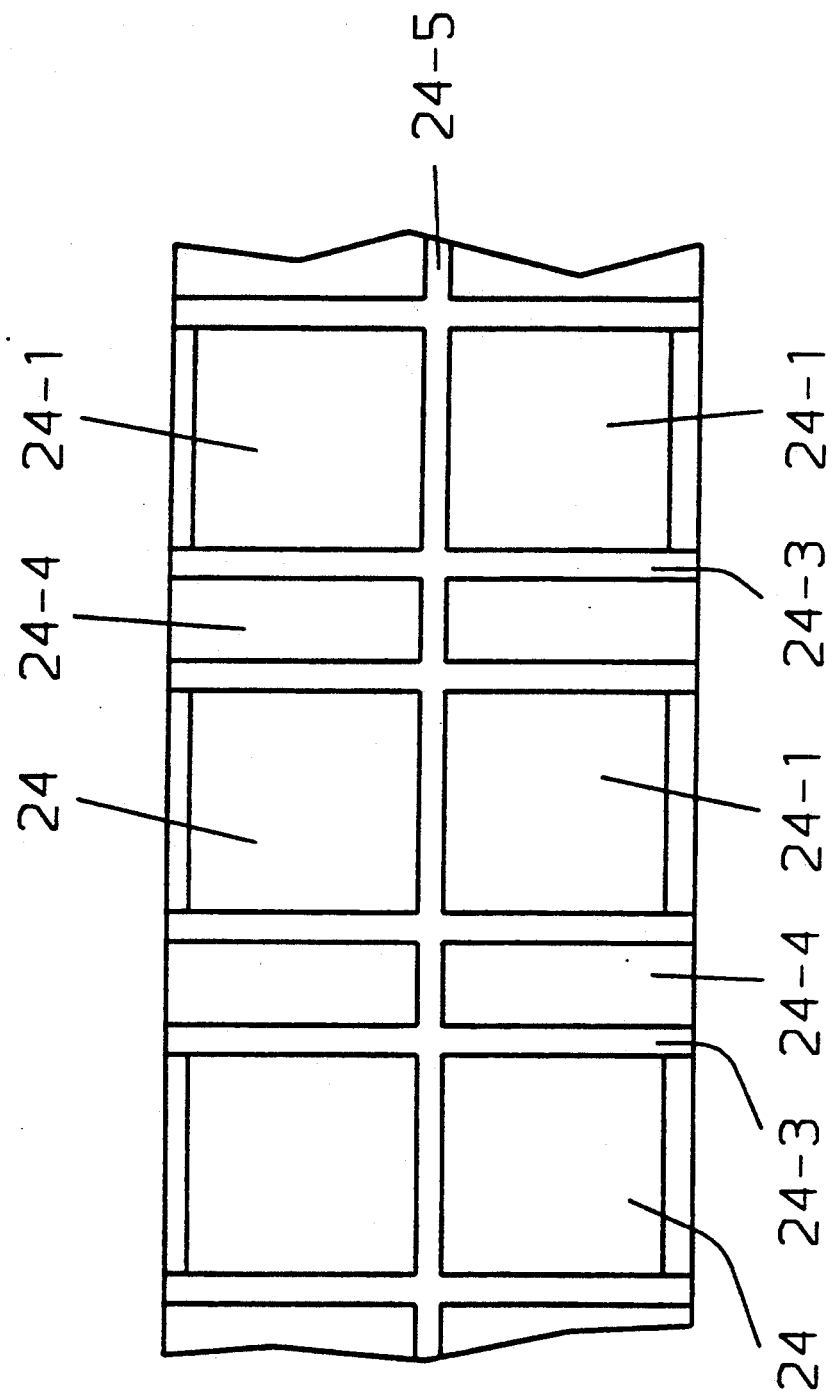
FIG. 6 is an unwrapped view taken along line 6—6 of FIG. 5.

In FIG. 1, the numeral 10 generally indicates a scroll compressor which is only partially illustrated. Scroll compressor 10 includes an orbiting scroll 12 with a wrap 12-1 and a fixed scroll 14 with a wrap 14-1. Orbiting scroll 12 has a boss 12-2 which is received in bore 20-1 of slider block 20. The line A—A represents the axis of crankshaft 30 while the line B—B represents the center of orbiting scroll 12 as well as the axis of bore 20-1. Referring specifically to FIGS. 3-6, the slider block 20 includes flats 20-2 and 20-3 and the axis B—B of bore 20-1 appears as point B. Bore 20-1 is made up of a plurality of axially and circumferentially spaced deflection pads 24 which may be of a tee shape with crosspieces 24-1 and which collectively define the bore 20-1 and a deflection bearing. Crosspieces 24-1 are connected to the rest of slider block 20 by webs 24-2. It will be noted that pads 24 are produced by making axial cuts 24-3 and circumferential cut 24-5 in slider block 20. Axial cuts 24-3 are paired in a mirror image relative to a radius of bore 20-1 extending through a web 24-2 to define a crosspiece 24-1 and its respective web 24-2. Each of the axial cuts 24-3 of a pair includes a first radially extending portion and a portion extending parallel to a tangent to the bore 20-1 to define an L-shaped cut and thereby define the crosspiece 24-1. Depending upon the width of the tangent portion of the axial cut 24-3, a sufficient web 24-2 may be inherently defined to provide the required deflection of crosspiece 24-1 or, if necessary or desired, a second radially extending portion of axial cut 24-3 is formed extending radially outward from the tangent portion to thereby define the web 24-2. Cuts 24-3 and 24-5 tend to fill with lubricant. Also, cuts 24-3 isolate pads 24 from recessed portions 24-4 which do not contact boss 12-2 as do pads 24. As best shown in FIG. 6, circumferential cut 24-5 axially divides bore 20-1 into upper and lower pads 24 and recessed portions 24-4. Cross pieces 24-1 of pads 24 may be coated or embedded with babbitt, leaded bronze, aluminum alloy, polymeric materials such as Vespil, Teflon and Teflon bearing compounds to reduce frictional forces.

Figure 2:
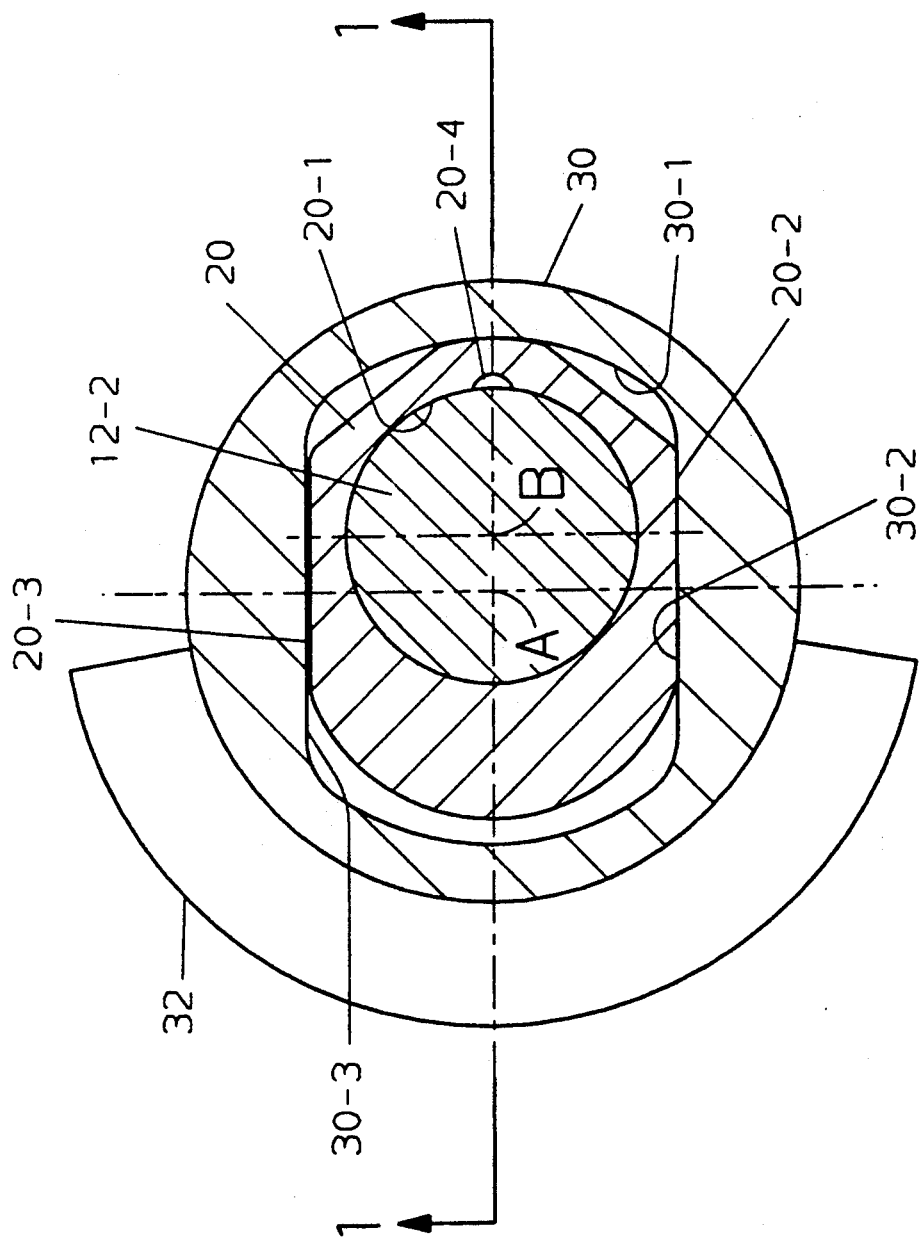
FIG. 2 is a sectional view of the slider block mechanism taken along line 2—2 of FIG. 1.
Figure 3:
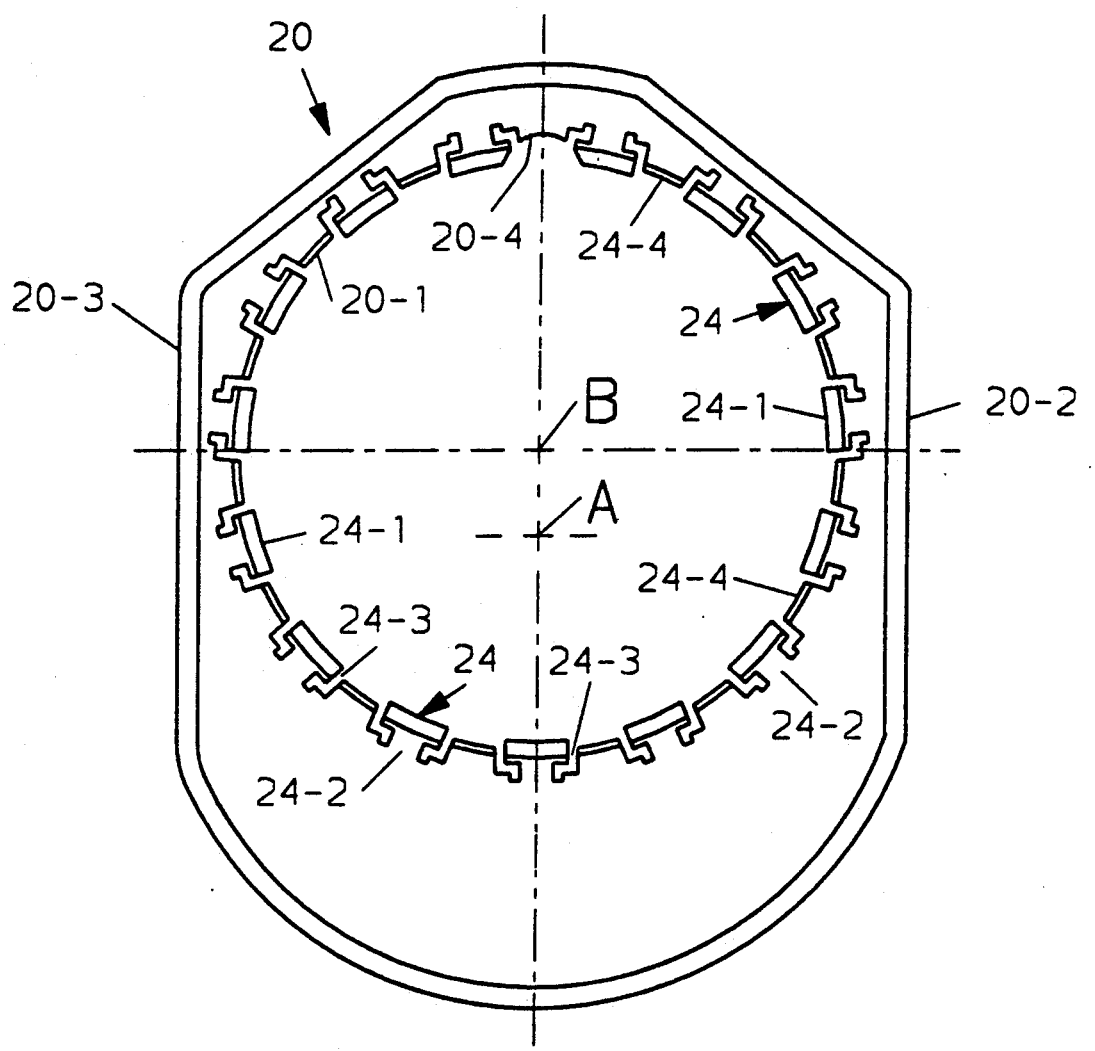
FIG. 3 is a top view of the slider block.
Figure 5:
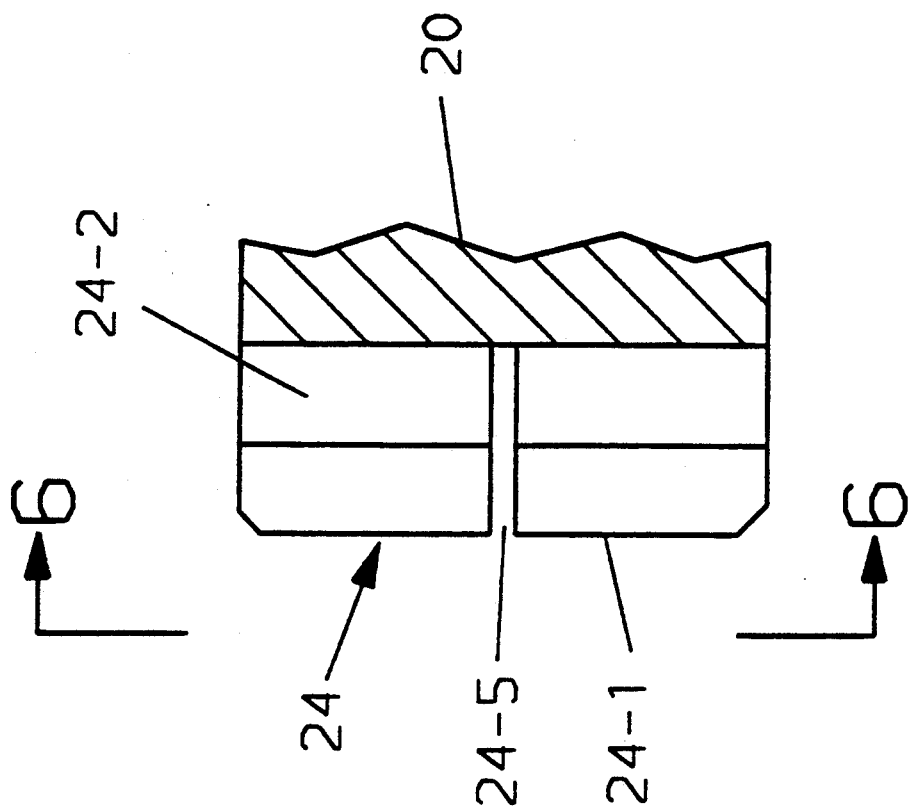
FIG. 5 is a sectional view taken along line 5—5 of FIG. 4.
Figure 4:
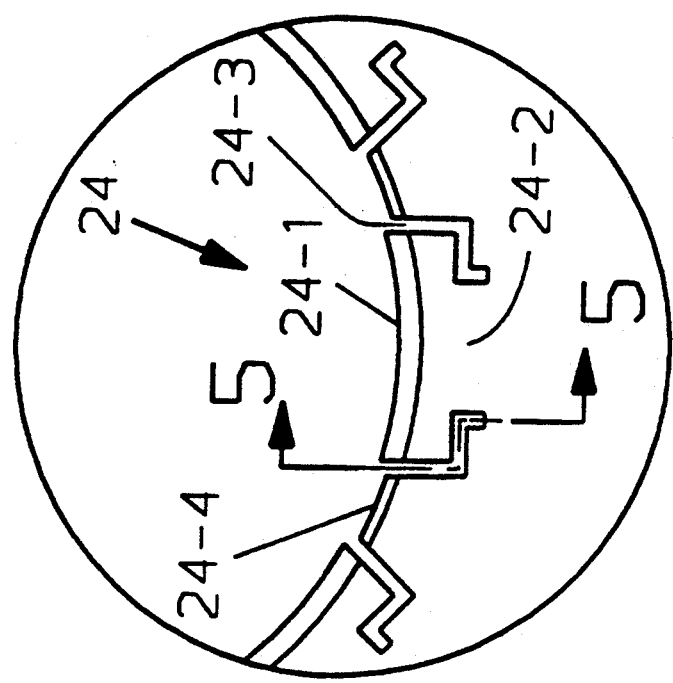
FIG. 4 is an enlarged view of a portion of FIG. 3.

As is best shown in FIG. 2, slider block 20 is received in elongated recess 30-1 of crankshaft 30 with slider block 20 located such that flats 20-2 and 20-3 can engage flats 30-2 and 30-3, respectively of recess 30-1. Slider block 20 rotates with crankshaft 30 as a unit. A reciprocating motion of slider block 20 in recess 30-1 is the only significant relative motion of slider block 20 with respect to crankshaft 30 during operation and this movement is generally on the order of 0.01 to 0.10 inches, at most. Specifically, slider block 20 is supported in recess 30-1 such that flat 20-2 engages flat 30-2 and flats 20-2 and 30-2 are parallel to a plane defined by axes A—A and B—B which appear as points A and B, respectively, in FIGS. 2 and 3.

During operation, as crankshaft 30, counterweight 32, and slider block 20 rotate together about A—A the axis of crankshaft 30, centrifugal force acts on slider block 20 causing it to move radially outward in recess 30-1 relative to A—A and along the plane defined by axes A—A and B—B. The engagement of flats 20-2 and 30-2 which are parallel to the plane defined by A—A and B—B facilitates movement of slider block 20. As slider block 20 moves, it carries boss 12-2 and, therefore, orbiting scroll 12 with it. Subject to the movement of slider block 20 due to centrifugal force and the gas forces acting on wrap 12-1 and any movement due to overriding a liquid slug, to hub trajectory within the bearing clearance, or the like, slider block 20 generally moves as a unit with crankshaft 30.

As crankshaft 30 rotates, oil from the sump (not illustrated) is forced into eccentric generally axial bore 30-4 which acts as a centrifugal pump. The pumped lubricant passes into recess 30-1 and through axial groove 20-4 where it lubricates boss 12-2 and pads 24. While crankshaft 30, and slider block 20 are rotating, boss 12-2 and orbiting scroll 12 are held to an orbiting motion by Oldham ring 28. As a result, groove 20-4 traverses the cylindrical surface of boss 12-2 providing lubrication thereto. Specifically, as noted above, axes A and B are spaced and this results in the loads acting on orbiting scroll 12 being cantilevered with respect to crankshaft 30. Conventionally, this results in edge loading on the bearing. Boss 12-2 is only able to engage crosspieces 24-1 of pads 24 and not recessed portions 24-4 between pads 24. However, since webs 24-2 permit deflection of pads 24, pads 24 can deflect to align with boss 12-2 while slider block 20 remains aligned with recess 30-1 without edge loading. Actually, the deflection of the pads 24 will take place as the deflection of one or more pads 24 on the top of one side of bore 20-1 and the corresponding deflection of pads 24 on the bottom of bore 20-1 and diametrically spaced from the other pads 24 which are deflected. The deflection will rotate around the pads 24 defining the bore 20-1 with the rotation of crankshaft 30. Additionally, the deflection of pads 24 helps to create a better wedge effect which, in turn, creates better oil film thicknesses thereby increasing load capacity and bearing life. Lubricant supplied to recess 30-1 also provides lubrication to the bearing 34 and orbiting scroll 12.

Although a preferred embodiment of the present invention has been illustrated and described, other changes will occur to those skilled in the art. For example, although the invention has been described in terms of a bearing located in and integral with a movable member, the slider block, the bearing could also be located in and integral with a stationary member. It is therefore intended that the scope of the present invention is to be limited only by the scope of the appended claims.

What is claimed is:

1. In a scroll compressor including a crankshaft and an orbiting scroll, a radial compliance mechanism with an integral deflection bearing comprising:

said crankshaft having an axis and an end having an elongated recess which said axis of said crankshaft passes through;

a slider block means adapted to be received in said recess such that a reciprocating motion of said slider block means in said recess is the only significant relative motion between said slider block means and said crankshaft;

a bore in said slider block means for receiving a boss formed on said orbiting scroll and having an axis spaced from and parallel to said axis of said crankshaft;

said bore being defined by a plurality of spaced pads which collectively define a deflection bearing whereby said pads and said boss coact to permit relative canting between said orbiting scroll and said crankshaft without producing edge loading when said crankshaft rotates about its axis driving said orbiting scroll.

2. The radial compliance mechanism of claim 1 wherein said pads are integral with said slider block means and each includes a crosspiece facing into said bore and connected to the rest of said slider block means by a web.

3. The radial compliance mechanism of claim 1 wherein said pads are circumferentially spaced by recessed areas.

4. The radial compliance mechanism of claim 1 wherein said pads are integral with said slider block means and are formed by a plurality of axial cuts extending radially outward from said bore and generally along a plane spaced from a plane tangent to said bore.

5. The radial compliance mechanism of claim 4 wherein said pads are further formed by a circumferential cut extending radially outward from said bore.

6. The radial compliance mechanism of claim 1 wherein said plurality of pads are axially and circumferentially spaced.

7. The radial compliance mechanism of claim 1 wherein said pads have a low friction surface.

8. A slider block means with an integral deflection bearing comprising:

said slider block means having at least one flat and a bore;

said bore being defined by a plurality of axially and circumferentially spaced pads each defined by a pair of L-shaped axial cuts having a radially extending portion and a portion extending parallel to a tangent to said bore and a circumferential cut extending radially outward from said bore whereby said pads collectively define a deflection bearing which permits forces to be transmitted between a first member engaging said one flat and a second member engaging at least some of said pads without edge loading.

9. The slider block means of claim 8 wherein said pads are integral with said slider block means and each includes a crosspiece facing on said bore and connected to the rest of said slider block means by a web.

10. The slider block means of claim 8 wherein said pads have a low friction surface.

11. A member with an integral deflection bearing comprising:
   said member having a bore;
   said bore being defined by a plurality of axially and circumferentially spaced pads each defined by a pair of L-shaped axial cuts having a radially extending portion and a portion extending parallel to a tangent to said bore and a circumferential cut extending radially outward from said bore whereby said pads collectively define a deflection bearing which permits forces to be transmitted between said member and a second member engaging at least some of said pads without edge loading.

12. The member of claim 11 wherein said pads are integral with said member and each includes a crosspiece facing on said bore and connected to the rest of said member by a web.

13. The member of claim 11 wherein said pads have a low friction surface.

* * * * *